(12) United States Patent
Grubwinkler et al.

(10) Patent No.: US 12,313,418 B2
(45) Date of Patent: May 27, 2025

(54) METHOD FOR PREDICTING A VELOCITY PROFILE OF A VEHICLE

(71) Applicant: Vitesco Technologies GmbH, Regensburg (DE)

(72) Inventors: Stefan Grubwinkler, Munich (DE); Hans Bauer, Munich (DE); Friedrich Graf, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 17/766,433

(22) PCT Filed: Oct. 6, 2020

(86) PCT No.: PCT/EP2020/077962
§ 371 (c)(1),
(2) Date: Apr. 4, 2022

(87) PCT Pub. No.: WO2021/069418
PCT Pub. Date: Apr. 15, 2021

(65) Prior Publication Data
US 2024/0053161 A1    Feb. 15, 2024

(30) Foreign Application Priority Data
Oct. 8, 2019  (DE) .................. 10 2019 215 376.3

(51) Int. Cl.
*G01C 21/34*  (2006.01)
*G08G 1/052*  (2006.01)

(52) U.S. Cl.
CPC ......... *G01C 21/3492* (2013.01); *G08G 1/052* (2013.01)

(58) Field of Classification Search
CPC ............................ G01C 21/3492; G08G 1/052
See application file for complete search history.

(56) References Cited

U.S. PATENT DOCUMENTS

| | | | |
|---|---|---|---|
| 2007/0038362 A1* | 2/2007 | Gueziec | G08G 1/096827 340/905 |
| 2008/0071465 A1* | 3/2008 | Chapman | G01C 21/3691 701/117 |

(Continued)

FOREIGN PATENT DOCUMENTS

| | | | |
|---|---|---|---|
| CN | 102509470 A | 6/2012 | ........... G08G 1/0968 |
| CN | 103632540 A | 3/2014 | ............... G08G 1/01 |

(Continued)

OTHER PUBLICATIONS

Search Report for International Application No. PCT/EP2020/077962, 11 pages, Feb. 23, 2021.

(Continued)

*Primary Examiner* — Seth A Silverman
(74) *Attorney, Agent, or Firm* — Slayden Grubert Beard PLLC

(57) ABSTRACT

Various embodiments include a method for operating a vehicle based on a future speed curve along a predetermined travel route up to a specific preview horizon. The method may include: generating a prediction model; supplying data to the model; using an algorithm to generate a predicted speed profile; selecting a datum for the second input data group depending on a situation analysis using predetermined criteria; and using a controller to: implement operating strategies for a vehicle, control exhaust aftertreatment systems, increase an accuracy of navigation algorithms, and/or predict operating states depending on the speed forecast. The input data include a first input data group containing geo-coordinates of the travel route and a second input data group containing at least one datum selected from the group consisting of: location information for a digital map, average traffic flow data along the travel route, and speed profiles of networked vehicles.

8 Claims, 2 Drawing Sheets

(56) References Cited

U.S. PATENT DOCUMENTS

| | | | | |
|---|---|---|---|---|
| 2008/0287141 | A1 | 11/2008 | Vogel | 455/456.3 |
| 2012/0245756 | A1* | 9/2012 | Cooprider | B60W 50/14 |
| | | | | 701/1 |
| 2014/0114556 | A1* | 4/2014 | Pan | G08G 1/0129 |
| | | | | 701/119 |
| 2014/0277835 | A1 | 9/2014 | Filev | 701/2 |
| 2018/0328299 | A1* | 11/2018 | Wang | F02D 35/023 |
| 2018/0364062 | A1* | 12/2018 | Wang | G06Q 10/063114 |
| 2019/0295412 | A1 | 9/2019 | Grubwinkler | G08G 1/052 |
| 2020/0346659 | A1 | 11/2020 | Düser | B60W 50/14 |
| 2020/0398835 | A1 | 12/2020 | Graf | B60W 30/14 |

FOREIGN PATENT DOCUMENTS

| | | | | |
|---|---|---|---|---|
| DE | 10 2004 055 275 | 5/2006 | | B60R 16/02 |
| DE | 10 2014 204 206 | 9/2014 | | B60W 30/14 |
| DE | 10 2017 209 667 | 6/2018 | | G08G 1/01 |
| DE | 10 2017 220 420 | 4/2019 | | G08G 1/01 |
| WO | 2019 060938 | 4/2019 | | B60W 40/00 |

OTHER PUBLICATIONS

Office Action for DE Application No. 10 2019 215 376.3, 5 pages, Jul. 17, 2020.

Chinese Office Action, Application No. 202080070719.6, 8 pages, Mar. 12, 2024.

\* cited by examiner

METHOD FOR PREDICTING A VELOCITY PROFILE OF A VEHICLE

CROSS-REFERENCE TO RELATED APPLICATIONS

This application is a U.S. National Stage Application of International Application No. PCT/EP2020/077962 filed Oct. 6, 2020, which designates the United States of America, and claims priority to DE Application No. 10 2019 215 376.3 filed Oct. 8, 2019, the contents of which are hereby incorporated by reference in their entirety.

TECHNICAL FIELD

The present disclosure relates to vehicle operations. Various embodiments of the teachings herein include methods and/or systems for predicting a speed profile of a vehicle.

BACKGROUND

Knowing the future speed profile is important for numerous powertrain applications. For example, knowing the expected driving profile trajectory can improve the operating strategy of hybrid, electric and combustion engine vehicles, adapt various vehicle functions to the individual driving behavior and estimate the energy requirement for the planned route, as well as various vehicle states (for example temperatures). For these applications, a prediction horizon that goes beyond the range of onboard sensors (radar, camera, etc.) is generally required. Attributes of digital maps (e.g. speed limits, bend radii) can be used for this. Alternatively, there are approaches in which the speed profile is predicted on the basis of collected trajectories of networked vehicles (crowdsourcing).

The prediction horizon is limited by environmental sensors due to the range of the sensors used (camera, radar). Attributes of digital maps are suitable for predicting the expected speed profile only to a limited extent since on many route sections the maximum speed cannot be reached owing to necessary braking operations. In addition, the individual driver's behavior influences the level of the speed profile.

One problem with the networked approach with crowdsourcing is that the approach is only possible if collected driving profiles are available, i.e. speed profiles have already been collected from other vehicles at this point. However, data collected from networked vehicles are not generally interchanged between different automobile manufacturers. This is a problem for those automobile manufacturers that still have few networked vehicles or only have a small market share in certain sales markets. This means that applications based on the prediction of the speed profile are not possible or are only possible for sections of the route.

Another disadvantage of networked solutions is a lack of a guarantee of vehicle networking ("dead spots"). A forecast of the speed profile through crowdsourcing is therefore not guaranteed across the board. The forecast of the speed profile is used as an input for operating strategies to reduce consumption and emissions. However, measures to reduce consumption and emissions (RDE consumption, eco-innovations) are only recognized by the legislature if they are available across the board.

SUMMARY

The teachings of the present disclosure include methods and control units that may be used to predict a speed profile of a vehicle, which can provide a reliable speed forecast for all route sections. For example, some embodiments include a method for predicting a speed profile (1) of a vehicle (2), which represents a future speed curve along a predetermined travel route (x) up to a specific preview horizon (3), wherein the method includes: generating a prediction model (4); inputting input data (5.1, 5.2) into the prediction model (4); calculating output data (6) from the input data (5.1, 5.2) on the basis of at least one algorithm contained in the prediction model (4), wherein the output data (6) predict the speed profile (1) of the vehicle (2); outputting the output data (6) from the prediction model (4); wherein the input data (5.1, 5.2) have a first input data group (5.1.1, 5.1.2, 5.1.3) containing at least geocoordinates (5.1.1) of the travel route (x), and a second input data group (5.2.1, 5.2.2, 5.2.3) containing various input data, namely at least location information (5.2.1) of a digital map; average traffic flow data (5.2.2) along the travel route (x); and/or speed profiles (5.2.3) of networked vehicles; wherein the input data from the second input data group (5.2.1, 5.2.2, 5.2.3) are selected on the basis of a situation analysis (6) using predetermined criteria (11).

In some embodiments, the location information (5.2.1) of a digital map has at least one element from a group containing geocoordinates of the vehicle (2); map attributes along the travel route (x), for example speed limits, traffic lights, traffic light phases, right of way rules, traffic signs, bend radii and/or gradients; and/or the average traffic flow data (5.2.2) along the travel route (x) represent a current traffic flow or historical traffic patterns.

In some embodiments, the first input data group (5.1.1, 5.1.2, 5.1.3) additionally contains vehicle data (5.1.2) having at least one element from a group containing a speed value of the vehicle (2); a current time; traffic message channel, TMC, data; temperature, humidity, rain, snow and/or ice data captured by the vehicle (2); image or video data captured by a vehicle camera; and brightness data captured by a brightness sensor of the vehicle (2); and/or the first input data group (5.1.1, 5.1.2, 5.1.3) additionally contains individual driving behavior data (5.1.3) generated on the basis of past trips, in particular a driver's behavior compared to the traffic flow, to speed quantiles or to map attributes, for example speed limits.

In some embodiments, in the situation analysis (6) using the predetermined criteria (11), an availability of the various input data (5.2.1, 5.2.2, 5.2.3) from the second input data group, and/or data protection requirements, and/or costs incurred through the use of the various input data (5.2.1, 5.2.2, 5.2.3) from the second input data group, and/or the respective road class on the travel route (x), and/or an influence of the various input data (5.2.1, 5.2.2, 5.2.3) from the second input data group on the quality of the prediction is/are taken into account.

In some embodiments, the situation analysis (6) uses at least one of the following predetermined criteria (11): on route sections without an adequate mobile data connection, input data from the second input data group (5.2.1, 5.2.2, 5.2.3), which were previously stored locally in the vehicle (2) or are received by means of the traffic message channel (TMC), are selected; on route sections without an adequate mobile data connection, input data from the second input data group (5.2.1, 5.2.2, 5.2.3), which are loaded in advance via a backend, are selected; on route sections for which there are no or outdated collected speed profiles (5.2.3), the location information (5.2.1) of a digital map and/or the average traffic flow data (5.2.2) along the travel route (x) is/are selected; with a preview horizon (3) of a certain minimum length, the location information (5.2.1) of a digital map and/or the average traffic flow data (5.2.2) in the form of historical traffic patterns is/are selected; on route sections for which no average traffic flow data (5.2.2) and no speed profiles (5.2.3) are available, the location information (5.2.1) of a digital map is selected; on country roads, the location information (5.2.1) of a digital map and the speed profiles (5.2.3) are selected; on freeways, the average traffic flow data (5.2.2) are selected, in combination with the individual driving behavior data (5.1.3) as described herein; if it is determined during the trip that the prediction based on certain input data from the second input data group (5.2.1, 5.2.2, 5.2.3) is imprecise compared to other input data from the second input data group, only the other input data from the second input data group (5.2.1, 5.2.2, 5.2.3) are selected; if the use of the speed profiles (5.2.3) is restricted by data protection guidelines or lowers one's own data protection preferences, the location information (5.2.1) of a digital map and the average traffic flow data (5.2.2) along the travel route (x) are selected; if a service fee for certain input data from the second input data group (5.2.1, 5.2.2, 5.2.3) exceeds a threshold value, other input data from the second input data group (5.2.1, 5.2.2, 5.2.3) are selected.

In some embodiments, distributions for collected speed profiles (5.2.3) with respect to fixed locations along the travel route (x) are created from the speed profiles (5.2.3) of networked vehicles (2).

In some embodiments, the first input data group (5.1.1, 5.1.2, 5.1.3) contains speed profiles at the current time or along a retrospective horizon (9).

As another example, some embodiments include a control unit configured to carry out the method as described herein.

BRIEF DESCRIPTION OF THE DRAWINGS

Further advantages and features of the teachings of the present disclosure are apparent from the following description, given by way of an example embodiment. In the Figures.

DETAILED DESCRIPTION

Figure 1:
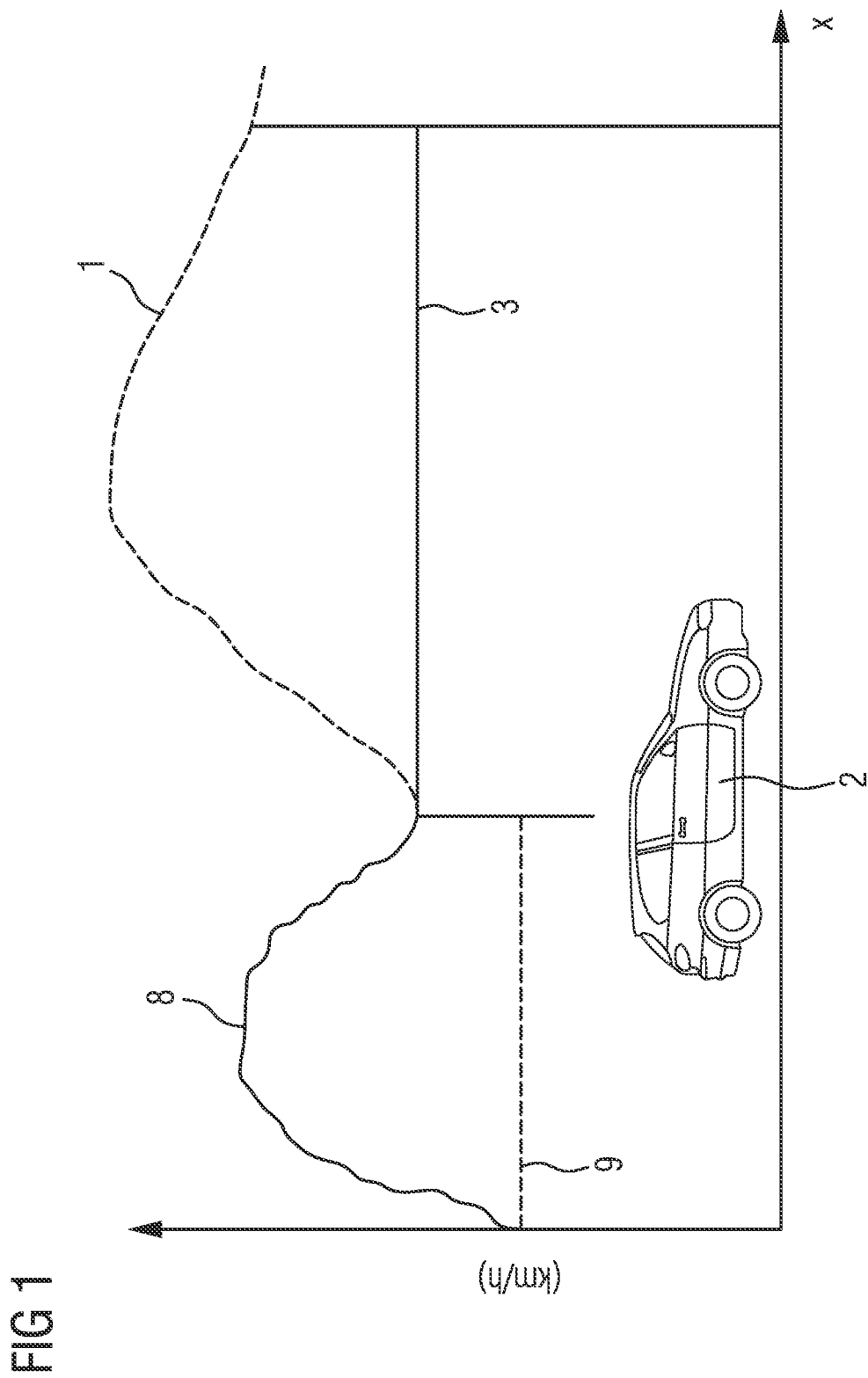
FIG. 1 schematically shows a prediction of a speed profile of a vehicle, which represents a future speed curve along a predetermined travel route up to a specific preview horizon.

The teachings of the present disclosure may be applied in a method for predicting a speed profile of a vehicle, wherein the speed profile represents a future speed curve along a predetermined travel route up to a specific preview horizon. The method has the following steps of: generating a prediction model; inputting input data into the prediction model; calculating output data from the input data on the basis of at least one algorithm contained in the prediction model, wherein the output data predict the speed profile of the vehicle; outputting the output data from the prediction model. The input data have a first input data group containing at least geocoordinates of the travel route, and a second input data group containing various input data, namely at least location information of a digital map; average traffic flow data along the travel route; and/or speed profiles of networked vehicles. The input data from the second input data group are selected on the basis of a situation analysis using predetermined criteria.

In this case, it is possible to create different models with different data sources. The models differ in terms of accuracy. Depending on the data availability and other boundary conditions (e.g. available LTE networking), the most suitable model should be selected automatically. This ensures that there are no longer any route sections for which no prognosis can be provided.

In some embodiments, the location information of a digital map has at least one element from a group containing geocoordinates of the vehicle; map attributes along the travel route, for example speed limits, traffic lights, traffic light phases, right of way rules, traffic signs, bend radii and/or gradients.

In some embodiments, the average traffic flow data along the travel route represent a current traffic flow or historical traffic patterns.

In some embodiments, the first input data group additionally contains vehicle data having at least one element from a group containing a speed value of the vehicle; a current time; traffic message channel, TMC, data; temperature, humidity, rain, snow and/or ice data captured by the vehicle; image or video data captured by a vehicle camera; and brightness data captured by a brightness sensor of the vehicle.

In some embodiments, the first input data group additionally contains individual driving behavior data generated on the basis of past trips, in particular a driver's behavior compared to the traffic flow, to speed quantiles or to map attributes, for example speed limits.

In some embodiments, in the situation analysis using the predetermined criteria, at least an availability of the various input data from the second input data group and/or data protection requirements and/or costs incurred through the use of the various input data from the second input data group and/or the respective road class on the travel route and/or an influence of the various input data from the second input data group on the quality of the prediction is/are taken into account. The input data from the second input data group may be selected as a separate method step in which one or more of these criteria mentioned is checked.

An availability of the various input data from the second input data group may include the instantaneous or general availability of the data. The instantaneous availability can be limited, for example, by a lack of radio connection (e.g. dead spots) due to time and/or location. The general availability is summarized here as to whether any corresponding data exist at all, i.e. whether, for example, speed profiles were collected for the respective route section, whether these data are current or outdated and/or whether any collected data are accessible.

For example, a service fee may be charged for access to such data. For this reason, any costs incurred for the selection of the input data from the second input data group can preferably also be taken into account. In addition, legal and/or personal data protection requirements can restrict the selection of the input data from the second input data group. The availability and/or the usefulness of using the various input data from the second input data group can also depend on the respective road class (e.g. country road or freeway) along the travel route.

In some embodiments, it can be determined during the trip that the prediction based on certain input data from the second input data group is more precise than when using other input data from the second input data group. The quality of the prediction can therefore also be taken into account when selecting the input data.

In some embodiments, the situation analysis therefore uses at least one of the following predetermined criteria: on route sections without an adequate mobile data connection, input data from the second input data group, which were previously stored locally in the vehicle or are received by means of the traffic message channel (TMC), are selected; on route sections without an adequate mobile data connection, input data from the second input data group, which are loaded in advance via a backend, are selected; on route sections for which there are no or outdated collected speed profiles, the location information of a digital map and/or the average traffic flow data along the travel route is/are selected;

with a preview horizon of a certain minimum length, the location information of a digital map and/or the average traffic flow data in the form of historical traffic patterns is/are selected;

on route sections for which no average traffic flow data and no speed profiles are available, the location information of a digital map is selected; on country roads, the location information of a digital map and the speed profiles are selected; on freeways, the average traffic flow data are selected, preferably in combination with the individual driving behavior data; if it is determined during the trip that the prediction based on certain input data from the second input data group is imprecise compared to other input data from the second input data group, only the other input data from the second input data group are selected; if the use of the speed profiles is restricted by data protection guidelines or lowers one's own data protection preferences, the location information of a digital map and the average traffic flow data along the travel route are selected; if a service fee for certain input data from the second input data group exceeds a threshold value, other input data from the second input data group are selected.

In some embodiments, distributions for collected speed profiles with respect to fixed locations along the travel route are created from the speed profiles of networked vehicles.

In some embodiments, the first input data group contains speed profiles at the current time or along a retrospective horizon.

Some embodiments include a control unit configured to carry out the methods described herein. It should be noted that example embodiments have been described with reference to different subjects. In particular, some embodiments of the teachings herein are described as methods and other embodiments are described as devices. However, it will become immediately clear to a person skilled in the art on reading this application that, unless explicitly stated otherwise, in addition to a combination of features which are associated with one type of embodiment, any combination of features which are associated with different types of subjects of the disclosure is also possible.

FIG. 1 schematically shows a prediction of a speed profile 1 of a vehicle 2, which represents a future speed curve along a predetermined travel route x up to a specific preview horizon 3. The reference sign 8 denotes a past speed curve along the travel route x up to a certain retrospective horizon 9.

Figure 2:
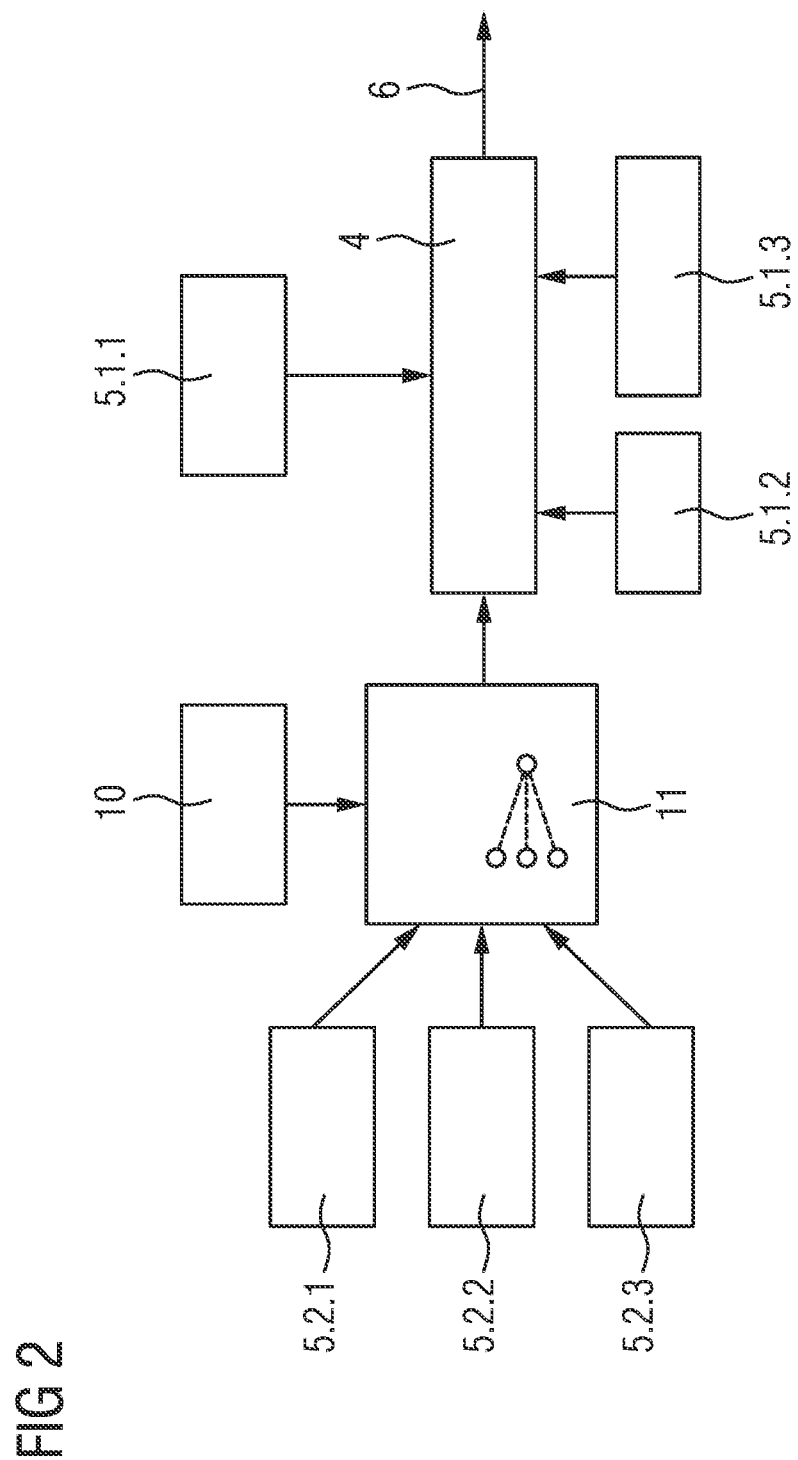
FIG. 2 schematically shows a system architecture for the method for predicting the speed profile of the vehicle incorporating teachings of the present disclosure.

FIG. 2 schematically shows a system architecture for the method for predicting the speed profile 1 of the vehicle 2 incorporating teachings of the present disclosure. The example method working with this system architecture has the following steps of: generating a prediction model 4; inputting input data 5.1, 5.2 into the prediction model 4; calculating output data 6 from the input data 5.1, 5.2 on the basis of at least one algorithm contained in the prediction model 4, wherein the output data 6 predict the speed profile 1 of the vehicle 2; and outputting the output data 6 from the prediction model 4.

The input data 5.1, 5.2 contain a first input data group 5.1.1, 5.1.2, 5.1.3 containing at least geocoordinates 5.1.1 of the travel route x. The intended route x of the vehicle 2 is used as input and can be specified by the driver or determined by an intelligent algorithm. Speed profiles at the current time or along the retrospective horizon 9 can also be input into the prediction model 4 together with the geocoordinates 5.1.1 of the travel route x (not shown in FIG. 2).

The first input data group 5.1.1, 5.1.2, 5.1.3 additionally contains vehicle data 5.1.2 having at least one element from a group containing a speed value of the vehicle 2; a current time; traffic message channel, TMC, data; temperature, humidity, rain, snow and/or ice data captured by the vehicle 2; image or video data captured by a vehicle camera; and brightness data captured by a brightness sensor of the vehicle 2.

The first input data group 5.1.1, 5.1.2, 5.1.3 additionally contains individual driving behavior data 5.1.3 generated on the basis of past trips, in particular a driver's behavior compared to the traffic flow, to speed quantiles or to map attributes, for example speed limits.

These additional input variables of the first input data group 5.1.1, 5.1.2, 5.1.3 serve to improve the forecast. For example, the vehicle data 5.1.2 serve to more precisely adjust the forecast for a short forecast horizon, for example for the next 100 m.

The input data 5.1, 5.2 contain a second input data group 5.2.1, 5.2.2, 5.2.3 containing various input data, namely at least location information 5.2.1 of a digital map; average traffic flow data 5.2.2 along the travel route x; and/or speed profiles 5.2.3 of networked vehicles.

The location information 5.2.1 of a digital map can be stored locally in the vehicle 2 (so-called onboard maps), or it can be loaded from a backend, for example a server, by mobile radio (e.g. LTE) (so-called offboard maps). The location information 5.2.1 of a digital map has at least one element from a group containing geocoordinates of the vehicle 2; map attributes along the travel route x, for example speed limits, traffic lights, traffic light phases, right of way rules, traffic signs, bend radii and/or gradients.

The average traffic flow data 5.2.2 along the travel route x represent a current traffic flow or historical traffic patterns.

Distributions for collected speed profiles 5.2.3 with respect to fixed locations can be created from the speed profiles 5.2.3 of networked vehicles.

The input data from the second input data group 5.2.1, 5.2.2, 5.2.3 may be selected on the basis of a situation analysis 10 using predetermined criteria 11. At least one of these data sources from the second input data group 5.2.1, 5.2.2, 5.2.3 is necessary in order to be able to carry out a speed forecast for a longer forecast horizon 3 (e.g. several km). These data sources are used as input data by a machine learning algorithm, and the speed profile 1 along the planned route x can be predicted therefrom. Various methods can be used as the prediction model 4 (e.g. regression, neural networks, support vector machines, long short-term memory networks (LSTM), recursive convolutional neural networks (RCNN), etc.). The prediction model 4 can be trained on the basis of specified input data 5.1, 5.2 and specified output data 6. The input data 5.1, 5.2 within the parameterizable retrospective horizon 9 can also be used as input here.

The accuracy of the forecast increases with the number of data sources used, i.e. in particular from the location information 5.2.1 of a digital map via the average traffic flow data 5.2.2 to the speed profiles 5.2.3 of networked vehicles. In this case, all input data from the second input data group 5.2.1, 5.2.2, 5.2.3 or only a subgroup of the input data of the second input data group 5.2.1, 5.2.2, 5.2.3 can be used as input. The selection of the input data from the second input data group 5.2.1, 5.2.2, 5.2.3 can be selected dynamically, so that a forecast of the speed profile 1 is available at any time. The dynamic selection of the second input data group 5.2.1, 5.2.2, 5.2.3 is described below.

The aim is to select the appropriate input data from the second input data group 5.2.1, 5.2.2, 5.2.3 at any time and in any situation and thus to be able to ensure a reliable speed forecast at any time. For reasons of accuracy, it is ideal to use all three of the input data mentioned from the second input data group 5.2.1, 5.2.2, 5.2.3. Depending on the situation, it makes sense to use only one or two specific input data from the second input data group 5.2.1, 5.2.2, 5.2.3. The situation analysis 10 uses at least one of the following predetermined criteria 11:

On route sections without an adequate mobile data connection (e.g. LTE), input data from the second input data group 5.2.1, 5.2.2, 5.2.3, which were previously stored locally in the vehicle 2 or are received by means of the traffic message channel (TMC), are selected. These can be onboard maps. On route sections without an adequate mobile data connection, input data from the second input data group 5.2.1, 5.2.2, 5.2.3, which are loaded in advance via a backend, may also be selected. In particular, if dead spots on these route sections are known in advance, for example through network coverage maps that can be partially formed through crowdsourcing, it is possible to load the information into the vehicle in advance via the backend. In this way, it is possible to predictively download traffic information, collected speed profiles or tiles of precise digital maps.

On route sections for which there are no or outdated collected speed profiles 5.2.3, the location information 5.2.1 of a digital map and/or the average traffic flow data 5.2.2 along the travel route x is/are selected.

With a preview horizon 3 of a certain minimum length, for example 3 h, the location information 5.2.1 of a digital map and/or the average traffic flow data 5.2.2 in the form of historical traffic patterns is/are selected. Possible applications for forecasts that are relatively far in the future are, for example, route planning for electric vehicles for future trips or the charging management of electric and hybrid vehicles.

On route sections for which no average traffic flow data 5.2.2 and no speed profiles 5.2.3 are available, the location information 5.2.1 of a digital map (offboard or onboard) is selected.

On country roads, the location information 5.2.1 of a digital map and the speed profiles 5.2.3 (possibly even outdated ones) are selected. Traffic flow information is generally not available on country roads. In addition, the individual speed is mainly determined by bend radii, visibility (e.g. bends that can be seen) and the altitude profile. The traffic flow therefore generally has little influence and is also often not precise enough even when available (e.g. speed reduction before bends or blind spots), so that it is better to use collected speed profiles 5.2.3. Since the impact on traffic is low, the collected speed profiles 5.2.3 may also be outdated.

On freeways, the average traffic flow data 5.2.2 are selected, preferably in combination with the individual driving behavior data 5.1.3 from the first input data group. On freeways, the forecast can be calculated primarily based on the average traffic flow data 5.2.2, taking into account the individual driving behavior data 5.1.3, since the traffic flow on freeways is up-to-date.

If it is determined during the trip that the prediction based on certain input data from the second input data group 5.2.1, 5.2.2, 5.2.3 is imprecise compared to other input data from the second input data group 5.2.1, 5.2.2, 5.2.3, only the other input data from the second input data group 5.2.1, 5.2.2, 5.2.3 are selected.

If the use of the speed profiles 5.2.3 is restricted by data protection guidelines or lowers one's own data protection preferences, the location information 5.2.1 of a digital map and the average traffic flow data 5.2.2 along the travel route x are selected.

If a service fee for certain input data from the second input data group 5.2.1, 5.2.2, 5.2.3 exceeds a threshold value, other input data from the second input data group 5.2.1, 5.2.2, 5.2.3 are selected.

The selected input data from the second input data group 5.2.1, 5.2.2, 5.2.3 ensures that a speed forecast is possible in every situation and the speed forecast can therefore be used as a reliable input variable for various applications.

The input data from the second input data group 5.2.1, 5.2.2, 5.2.3 and the corresponding prediction model 4 can be selected dynamically depending on data availability, accuracy, road class, user preferences, intended application and prediction horizon 3.

The teachings of the present disclosure can also be used to implement operating strategies for HEV, EV or conventional vehicles, to control exhaust aftertreatment systems, to increase the accuracy of navigation algorithms and for route applications for EVs. It can also be used to predict operating states depending on the speed forecast, e.g. In order to positively influence the derating behavior of an electric drive. Finally, information can be stored in digital maps.

LIST OF REFERENCE SIGNS

1 Speed profile
2 Vehicle
3 Preview horizon
4 Prediction model
5.1 Input data
5.1.1 Geocoordinates
5.1.2 Vehicle data
5.1.3 Individual driving behavior data
5.2 Input data
5.2.1 Location information of a digital map
5.2.2 Average traffic flow data
5.2.3 Speed profiles of networked vehicles
6 Output data
8 Past speed curve
9 Retrospective horizon
10 Situation analysis
11 Predetermined criteria

The invention claimed is:

1. A method for operating a vehicle based on a predicted speed profile for the vehicle representing a future speed curve along a predetermined travel route up to a specific preview horizon, the method comprising:
   generating a prediction model;
   supplying input data to the prediction model;
   calculating output data using the input data and an algorithm contained in the prediction model, wherein the output data describe the predicted speed profile for the vehicle along the predetermined travel route;

transmitting the output data from the prediction model to a controller associated with the vehicle;

wherein the input data include a first input data group containing geocoordinates of the travel route and a second input data group containing at least one datum selected from the group consisting of: location information for a digital map, average traffic flow data along the travel route, and speed profiles of networked vehicles;

selecting a datum for the second input data group depends on a situation analysis using predetermined criteria; and using the controller to: implement operating strategies for a vehicle, control exhaust aftertreatment systems, and/or predict operating states depending on the speed forecast;

wherein the predetermined criteria include at least one element selected from the group consisting of: an availability of the various input data the second input data group, data protection requirements, the respective road class on the travel route, and an influence of the various input data from the second input data group on the quality of the prediction.

2. The method as claimed in claim 1, wherein the location information for a digital map includes at least one element selected from a group consisting of: geocoordinates of the vehicle, map attributes along the travel route, and the average traffic flow data along the travel route represent a current traffic flow or historical traffic patterns.

3. The method as claimed in claim 1, wherein:
the first input data group additionally contains vehicle data having at least one element selected from a group consisting of: a speed value of the vehicle, a current time, traffic message channel data, temperature, humidity, rain, snow, ice, image, or video data captured by a vehicle camera, and brightness data captured by a brightness sensor of the vehicle; or
the first input data group additionally contains individual driving behavior data generated on the basis of past trips.

4. The method as claimed in claim 1, wherein the predetermined criteria include costs incurred through the use of the various input data from the second input data group.

5. The method as claimed in claim 1, wherein the predetermined criteria include at least one factor selected from the group consisting of:
on route sections without an adequate mobile data connection, input data from the second input data group previously stored locally in the vehicle or received by means of the traffic message channel are selected;
on route sections without an adequate mobile data connection, input data from the second input data group loaded in advance via a backend are selected;
on route sections for which there are no or outdated collected speed profiles, the location information of a digital map and/or the average traffic flow data along the travel route are selected;
with a preview horizon of a certain minimum length, the location information of a digital map and/or the average traffic flow data in the form of historical traffic patterns are selected;
on route sections for which no average traffic flow data and no speed profiles are available, the location information of a digital map is selected;
on country roads, the location information of a digital map and the speed profiles are selected;
on freeways, the average traffic flow data are selected;
if it is determined during the trip that the prediction based on certain input data from the second input data group is imprecise compared to other input data from the second input data group, only the other input data from the second input data group are selected;
if the use of the speed profiles is restricted by data protection guidelines or lowers one's own data protection preferences, the location information of a digital map and the average traffic flow data along the travel route are selected;
if a service fee for certain input data from the second input data group exceeds a threshold value, other input data from the second input data group are selected.

6. The method as claimed in claim 1, further comprising creating distributions for collected speed profiles with respect to fixed locations along the travel route from the speed profiles of networked vehicles.

7. The method as claimed in claim 1, wherein the first input data group contains speed profiles at the current time or along a retrospective horizon.

8. A control unit comprising:
a processor; and
a memory storing a set of instructions for operating a vehicle based on a predicted speed profile for the vehicle representing a future speed curve along a predetermined travel route up to a specific preview horizon, the set of instructions, when accessed and executed by the processor, cause the processor to:
generate a prediction model;
supply input data to the prediction model;
calculate output data using the input data and an algorithm contained in the prediction model, wherein the output data described the predicted speed profile for the vehicle along the predetermined travel route;
wherein the input data include a first input data group containing geocoordinates of the travel route and a second input data group containing at least one datum selected from the group consisting of: location information for a digital map, average traffic flow data along the travel route, and speed profiles of networked vehicles;
select a datum for the second input data group depends on a situation analysis using predetermined criteria; and
implement operating strategies for a vehicle, control exhaust aftertreatment systems, and/or predict operating states depending on the speed forecast;
wherein the predetermined criteria include at least one element selected from the group consisting of: an availability of the various input data the second input data group, data protection requirements, the respective road class on the travel route, and an influence of the various input data from the second input data group on the quality of the prediction.

* * * * *